United States Patent Office 3,784,523
Patented Jan. 8, 1974

3,784,523
REACTION OF HALOMETHYLATED POLYMERS WITH QUATERNARY AMMONIUM SALTS OF PROTECTED AMINO ACIDS
Albert Loffet, Braine-le-Chateau, Belgium, assignor to UCB, Societe Anonyme, Saint-Gilles-lez-Brussels, Belgium
No Drawing. Filed July 21, 1970, Ser. No. 56,972
Claims priority, application Belgium, July 25, 1969, 37,542
Int. Cl. C08g 20/00; C07c 103/52, 101/42
U.S. Cl. 260—78 A
6 Claims

ABSTRACT OF THE DISCLOSURE

The present invention relates to a process for binding an amino acid having an amine protective group fixed on the amino group to a styrene-divinylbenze polymer carrying halomethyl groups, by reacting a salt of the so protected amino acid with the said halomethylated styrene-divinylbenzene polymer in an inert solvent to form an amino acid ester useful in solid phase peptide synthesis, whereby the salt is dissolved in said solvent and the polymer is swelled in said solvent, the improvement wherein the salt of the said protected amino acid is a salt of aquaternary ammonium hydroxide of the formula:

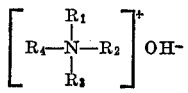

wherein $R_1$, $R_2$, $R_3$ and $R_4$, taken separately, each represents a member selected from the group consisting of alkyl having 1 to 18 carbon atoms, cycloalkyl having 5 to 12 carbon atoms, phenyl, naphthyl, aralkyl having 7 to 16 carbon atoms, or $R_1$ and $R_2$ together with the quaternary nitrogen atom form piperidinyl or morphinyl, or $R_1$, $R_2$ and $R_3$ taken together form pyridyl or 2-styryl-pyridyl.

---

The present invention is concerned with a process of esterification between an amino acid carrying a protected amino group and a halomethylated polymer for the synthesis of polypeptides by the so-called solid phase process.

As is known, polypeptides are becoming increasingly important in the pharmaceutical field. For example, insulin, oxytocin, ACTH and many other hormone substances possess a polypeptide chain.

These compounds containing polypeptide chains are constituted by amino acids connected together by the formation of an amide bond between the carboxyl groups of one and the amino groups of the other, thus forming a polypeptide chain which can contain 100 or more elementary amino acid residues.

The pharmacological activity of a polypeptide is intimately connected with the order in which the amino acids are connected together in the polypeptide chain. For this reason, it is necessary to use methods which enable the amino acids or fragments of polypeptide chains (composed of amino acids connected to one another in a chain in known sequence) to be connected together in a nonambiguous manner.

At present, various methods are known for synthesising these polypeptide chains. It is possible to work in the homogeneous or liquid phase or in the heterogeneous or solid phase. The present invention is concerned with the latter method.

In the synthesis of polypeptides in the heterogeneous or solid phase, grafting is effected on a polymer which is insoluble in the solvents used and purification in each stage is effected by simply washing the polymer. The following equations for the reactions explain the procedure:

Esterification
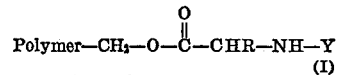
(I)

Unblocking (or diprotection) of the amine group.
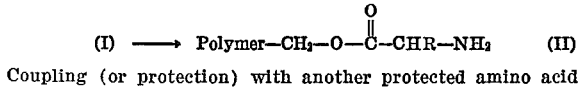
(II)

Coupling (or protection) with another protected amino acid
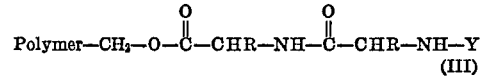
(III)

Unblocking
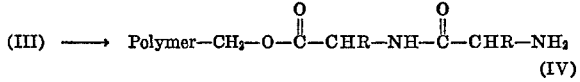
(IV)

Coupling
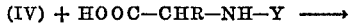
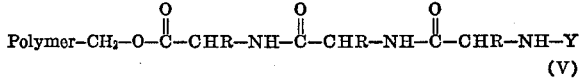
(V)

and so forth, X being a halogen atom, a hydroxyl group or a methylthio radical, Y being a protective group and R being any desired radical.

This method is excellent because it eliminates the troublesome purification of the various intermediate products formed in the course of the sythesis and because it is suitable for complete automtion of the operations.

When X is a halogen atom, particularly a chlorine atom, use is made of the Merrifield process, which is the solid phase synthesis method most often used (see R. B. Merrifield, J.A.C.S., 85 (1963), 2149-2154; J. M. Stewart and J. D. Young, "Solid Phase Peptide Synthesis" (pub. W. H. Freeman and Co., 1969). This process consists in fixing the triethylamine salt of the protected amino acid on to a chloromethylated polymer in accordance with the equation:

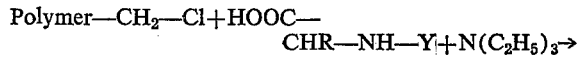
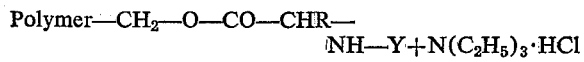

Nevertheless the Merrifield method of esterification has various disadvantages. Thus, a secondary reaction occurs between the chloromethylated polymer and the triethylamine in accordance with the equation:

In the course of the synthesis of the polypeptide chain, whenever there is a new bonding of a protected amino acid on to the polypeptide chain, part of this protected amino acid will be fixed on the triethylammonium salt by an ionic bond (Stewart & Young, loc.cit.) as follows:

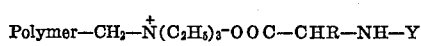

At the moment of the deprotection of the polypeptide chain, this protected acid will again be freed and will be lost in the rinsing solution. In other words, the polymer behaves like an ion exchanger and, whenever a protected amino acid is bonded to the polypeptide chain being formed, there will be a loss of protected amino acid proportional to the chloromethylated sites of the resin occupied by the triethylamine. This loss is a serious disadvantage of the Merrified process and the elimination of this loss of extremely expensive raw material would constitute considerable progress.

Another disadvantage of the Merrifield process is that, up to the present time, the yields of the bonding of the protected amino acids on to the chloromethylated polymer are only of the order of 20 to 25% for a 100% excess of protected amino acid referred to the amount of reactive chlorine in the chloromethylated polymer. It would, therefore, be very advantageous to be able to increase these bonding yields to the greatest possible extent in order to improve the economy of the process.

Yet another disadvantage of the Merrifield process is that, because some of the sites of the chloromethylated polymer are occupied by triethyl ammonium groups, analytical difficulties are encountered in the determination of nitrogen, part of the latter relating to the esterified amino acid and the remainder to the triethyl ammonium groups thus bonded. If this parasitic reaction of the bonding of trimethyl ammonium groups on certains sites of the chloromethylated polymer could be eliminated, it would only be necessary to determine the total nitrogen to know the content of amino acid bonded on the resin. This is of great practical importance because, in each intermediate stage, it is necessary to carry out these analyses in order to follow step by step the progress of the polypeptide synthesis.

The present invention is concerned with the suppression or at least the substantial elimination of these various disadvantages of the Merrifield process.

Therefore, it is an object of the present invention to provide an improvement in the synthesis of polypeptide by the so-called heterogeneous or solid phase process, in which a halomethylated polymer is esterified with an amino acid, the amino group of which is protected, in a solvent which swells the halomethylated polymer without dissolving it and in the presence of an esterifiecation agent and in which after deprotection of the amino group of the polymer-amino acid system thus formed, at least one amino acid is fixed in known manner on to the system in order to form a polypeptide, characterized in that the esterification agent used in a quaternary ammonium hydroxide of the general formula:

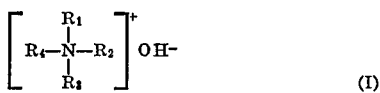

(I)

wherein $R_1$, $R_2$, $R_3$ and $R_4$, which may be the same or different, are alkyl, cycloalkyl, aryl, aralkyl or heterocyclic radicals, and wherein two or three of the $R_1$ to $R_4$ radicals may constitute, together with the quaternary nitrogen atom, an unsubstituted or substituted heterocyclic radical.

In the above-given General Formula I, by "alkyl radicals" there are to be understood those containing - to 18 carbon atoms, for example, methyl, ethyl, propyl, butyl, amyl, hexyl, 2-ethylhexyl, decyl, dodecyl, tetradecyl, hexadecyl and octadecyl radicals; by "cycloalkyl radicals" there are to be understood radicals containing 5 to 12 carbon atoms, which may be substituted, for example, cyclopentyl and cyclohexyl radicals; by "aryl radicals" there are to be understood radicals such as phenyl or naphthyl radicals which may be substituted; by "aralkyl radicals" there are to be understood those containing 7 to 16 carbon atoms, which may be substituted, for example, benzyl and phenethyl radicals; and by "heterocyclic radicals" there are to be understood radicals containing heteroatoms, such as oxygen, sulphur and nitrogen atoms, for example pyridyl, piperidinyl and morpholinyl radicals.

Examples of quaternary ammonium hydroxides of General Formula I include tetramethyl-ammonium hydroxide, tetraethyl-ammonium hydroxide, tetrabutyl-ammonium hydroxide, methyl-tri-(n-butyl)-ammonium hydroxide, phenyl - trimethyl - ammonium hydroxide, N-benzyltrimethyl-ammonium hydroxide, N-dodecyl-pyridinium hydroxide and N methyl-2-styryl-pyridinium hydroxide. Among the quaternary ammonium hydroxides which may be used in accordance with the present invention, a few examples of which are mentioned above, tetramethyl-ammonium hydroxide is particularly preferred.

The halomethylated polymer used in accordance with the present invention is one which carries the halomethyl groups in which the halogen may be bromine, iodine, or preferably, chlorine. The halomethylated polymer used in the process of the present invention may advantageously be a styrene-divinylbenzene copolymer resin containing chloromethyl groups because these resins are commercially available, for example, from the following firms: Fluka A.G., Switzerland; and Calbiochem, Mann, Schwarz Bioresearch and Miles, United States of America. These resins generally contain from 0.2 to 2.5 milliatom-gram of chlorine per gram of resin. It is not advisable to use chlorine contents higher than 2.5 milliatom-gram because they might lead to the formation of an excessive number of peptide chains so that steric hindrance might occur during the synthesis. It is generally preferred to use, according to the present invention, resins containing 0.2 to 2.2 milliatom-gram of chlorine per gram of resin.

By "amino acid" is to be understood any compound containing at least one amino or imino group and at least one carboxyl group. Among the compounds complying with this definition, there may be mentioned the amino and imino acids participating in the composition of proteins, such as alanine, arginine, aspartic acid, asparagine, cystine, cysteine, glutamic acid, glycine, histidine, delta-hydroxylsine, gamma-hydroxyproline, isoleucine, leucine, lysine, methionine, beta-phenylalanine, proline, serine, threonine, trytophane, tyrosine and valine, as well as the optical antipodes, diastereoisomers and racemic mixtures thereof. In addition, the term "amino acid" includes those not participating in the composition of proteins, whether natural or synthetic, for example, straight chain mono-amino and mono-carboxylic aliphatic amino acids containing amino or imino groups in, for example, the alpha-, beta-, gamma- or delta-position, such as butyrine, norvaline, beta-alanine, gamma-aminobutyric acid and norleucine; polycarboxylic amino acids, optionally containing subsidiary groups, for example, alpha-aminoadipic acid, alpha-aminosuberic acid, beta-hydroxyglutamic, bet a- hydroxyaspartic acid, beta - gamma - dihydroxy-glutamic acid, gamma-methylene-glutamic acid, beta-phenylglutamic acid and alpha-aminotricarballylic acid; diamino-monocarboxylic acids, such as beta-aminoalanine, ornithine, citrulline (carbamyl group), homoarginine (guanidine group) and norarginine; imino acids optionally containing subsidiary groups, such as gamma-methylproline, pipecolic acid and 5-hydroxypipecolic acid; the alpha-alkylated amino acids, such as alpha-methylalanine and 1 - aminocyclopropane - 1 - carboxylic acid; beta-branched amino acids, such as tertiary leucine and beta-methyl-tryptophane; alpha-amino acids containing a hydroxyl or ether function, such as beta-phenylserine, gamma-oxalysine and gamma-hydroxyornithine; amino acids containing sulfur atoms, such as 2-thiol-histidine, ethionine and lanthionine; alpha-amino acids substituted by ring systems, such as the phenyl- and cyclohexyl-amino acids, the analogues of phenylalanine, the analo-tyrosine and the analogues of tryptophane; and the N-alkylated amino acids, such as sarcosine (N-methyl-glycine).

The solvents to be used in the process of the present invention in the course of the esterification may in principle, comprise any solvent capable of swelling the halomethylated polymer without dissolving it while, at the same time, being inert with regard to the components of the esterification reaction. As examples thereof, there may be mentitoned the aromatic hydrocarbons, such as benzene, toluene and the xylenes; chlorinated aliphatic hydrocarbons, such as methylene chloride and chloroform; lower aliphatic alcohols, such as methanol, ethanol, propanol and isopropanol; esters, such as ethyl acetate; ethers, such as dioxan and tetrahydrofuran; amides, such as dimethyl formamide; and sulphoxides, such as dimethyl sulphoxide.

The operating conditions to be employed for the esterification vary, depending upon the nature of the solvent and also on the reactivity both of the halomethylated polymer and of the protected amino acid. When the solvent has a low dissolving power for the halomethylated polymer, it is possible for the esterification to be carried out, without disadvantage, up to the boiling temperature of the solvent; this is the case, for example, with dioxan. On the other hand, in the case of, for example, dimethyl formamide, care must be taken not to dissolve the halomethylated polymer which is why it is recommended to work, in this case, at or near room temperature.

With regard to the reactivity of the halomethylated polymer, we have found that iodomethylated polymers are more reactive than the bromomethylated polymers and that the latter in turn are more reactive than the chloromethylated polymers. Consequently, with the iodomethylated and bromomethylated polymers, it is possible to carry out the esterification at lower temperatures than in the case of the use of the chloromethylated polymers. However, as a rule, the reactivity of chloromethylated polymers is sufficient in the majority of cases and it is only exceptionally that it is necessary to use bromomethylated or iodomethylated polymers, these being less interesting than chloromethylated polymers both as regards the ease with which they can be obtained and as regards their cost.

With regard to the reactivity of the protected amino acid, this varies with the nature of the latter. The less the steric hindrance, the higher this reactivity will be. As an example, glycine (less hindrance) is more reactive than valine (more hindrance).

The esterification times and temperatures will, therefore, necessarily vary, depending upon the nature of the solvent, the reactivity of the halomethylated polymer and the reactivity of the protected amino acid. The reaction temperatures used are between room temperature and the boiling temperature of the solvent used, for example about 110° C. in the case of dioxan. Neverthless, the most favorable temperatures are between 50 and 100° C., preferably about 70–80° C., while it is again to be mentioned that, in cases where a very effective solvent is used, such as dimethyl formamide, it is not possible to go much above ambient temperature since otherwise the halomethylated polymer would be dissolved. Another criterion which must also be taken into account is the tendency of certain amino acids to racemize or epimerize when heated to excessively high temperatures; with compounds of this type, it is necessary for the reaction temperature to be appropriately limited. As a general rule, the higher the esterification temperature and the greater the reactivity of the halomethylated polymer, the shorter the esterification times will be. For this reason, the time may vary between a few minutes and several tens of hours, depending on the circumstances.

The amino acid to be esterified with the halomethylated polymer according to the process of the present invention always has its amino group protected at the moment of esterification. The o-nitrophenylsulfenyl group (abbreviated as NPS), the benzyloxycarbonyl group (abbreviated as Z), the p-methoxybenzyloxycarbonyl group (abbreviated as (OMe)Z), the amyloxycarbonyl group (abbreviated as AOC) and, preferably, the t-butyloxycarbonyl group (abbreviated as t-BOC) may be mentioned as examples of protective groups which can be fixed reversibly on to the amino group of the amino acid. There is no limitation as regards the selection of the protective group to be used, provided that this group can be easily removed from the amine group of the amino acid and permits the coupling of the second amino acid to the amine group thus liberated, with a view to the synthesis of the polypeptide.

The esterification, according to the process of the present invention of the halomethylated polymer with the protected amino acid may be effected in various ways, namely:

(a) The salt of the protected amino acid and the quaternary ammonium hydroxide in alcoholic solution is first prepared, the solution is evaporated to isolate the salt and the latter is dried in known manner. The halomethylated polymer is then added to the dried residue in a vessel and, at the same time, a sufficient quantity of anhydrous solvent is introduced to swell the halomethylated polymer completely and to dissolve the quaternary ammonium salt of the proected amino acid. The mixture is heated, if necessary, and it may also be agitated, although heating and agitation are not essential in all cases. At the end of the reaction, the polymer carrying the protected amino acid is separated by filtration or centrifuging and the polymer is washed in known manner. The polymer thus obtained is ready for use, both for polypeptide synthesis and for analysis.

(b) The salt is formed between the quaternary ammonium hydroxide and the protected amino acid dissolved in alcohol and the halomethylated polymer is then added, the alcohol is evaporated and the residue dried, whereupon the solvent serving as reaction medium is added. The actual esterification and the purification operations are carried out as in (a).

The protected amino acid and the quaternary ammonium hydroxide are used in the process according to the present invention in stoichiometric amounts or with a slight excess of protected amino acid. It is disadvantageous to operate in the presence of an excess of quaternary ammonium hydroxide because of the risk of saponification of the ester formed between the halomethylated polymer and the protected amino acid. In addition, certain sites of the halomethylated polymer might be converted into hydroxyl groups.

The molar ratio between the salt formed (protected amino acid/quaternary ammonium hydroxide) and the halomethylated polymer is between 3/1 and 0.5/1 and is preferably about 1/1. It is possible to operate with a proportion higher than 3/1 but, in that case, a very expensive product (the protected amino acid) is wasted, without any additional advantage being gained.

The advantages of the process according to the present invention are very considerable:

(1) As there is no fixing of the quaternary ammonium hydroxide on the halomethylated polymer, the process is more economical since there is no loss of protected amino acids in the course of the various stages of the synthesis of the polypeptides by ion exchange, as has been explained above.

(2) The yields of the fixing of protected amino acids on the halomethylated polymer are more than doubled in comparison with the previously known process; whereas hitherto these yields amounted to from 20 to 25%, in the process of the present invention, they amount to at least 45% and can reach or even exceed 70%.

(3) In view of the fact that, as explained in (1), there is no fixing of quaternary ammonium hydroxide on the halomethylated polymer, the laborious methods of determining amino acids can be dispensed with and a simple analysis of total nitrogen is sufficient to determine the content of amino acid fixed on the halomethylated polymers; the benefit of this simplification manifests itself in each of the subsequent stages of fixation of amino acids in the synthesis of polypeptides, which is an important technological advance.

(4) The advantages mentioned in (1) to (3) are gained without sacrificing any of the advantages inherent to the synthesis of polypeptides in the heterogeneous or solid phase.

The following examples are given for the purpose of illustrating the present invention:

EXAMPLE 1

1.16 millimoles t-BOC-glycine (203 mg.), dissolved in 10 ml. anhydrous methanol, are introduced into a 100 ml. Erlenmeyer flask and neutralized with 0.38 ml. of a 3 N methanolic solution of tetramethyl-ammonium hydroxide. The solution is evaporated in vacuo and dried in a desiccator over phosphorus pentoxide in a vacuum of 1 mm. Hg for 2 hours. 1 g. of chloromethylated polymer (containing 2.06% of chlorine, i.e. 0.58 milliatom-gram per gram of resin) is added to the resulting tetramethyl-ammonium salt in t-BOC-glycine.

The reaction vessel is placed in an oil bath and dioxan, which has been dried over calcium hydride, is introduced by distillation in an amount such that the resin swells and is covered with the solvent.

The reaction mixture is agitated and is heated to 80° C. overnight (about 16 hours).

The esterified polymer is then filtered off and washed successively with dioxan, acetic acid, water and methanol, whereupon it is dried to a constant weight.

An aliquot is heated for 16 hours in a mixture of 12 N hydrochloric acid/dioxan (1:1 by volume) in order to determine the amount of fixed amino acid by automatic analysis in an ion exchange column. The amount of glycine fixed on the resin is 0.4 millimole per gram of resin. Another aliquot part is used to determine the elementary nitrogen (Kjeldahl's method). The amount of nitrogen fixed on the polymer is 0.57%, i.e., 0.41 milliatom-gram per gram of resin.

Esterification yield: 70%, referred to the amount of chlorine which can be substituted.

In conclusion, whereas hitherto the esterification yields, when using triethylamine as esterification agent, amounted at most to 20–25%, it can be seen that, by using the esterification agent according to the present invention, the esterification yield is almost trebled. The perfect agreement between the analyses of amino acid and elementary nitrogen is also to be noted, thus justifying henceforth the omission of the amino acid analysis, which is very delicate and lengthy, and, at the same time, showing that the parasitic reaction between the chloromethylated polymer and the esterification agent is eliminated in the process according to the present invention, with the corollary of the elimination of waste of t–BOC–amino acids in the course of the various stages of the polypeptide synthesis.

EXAMPLE 2

The object of this example is a comparison between the process of the present invention, in which tetramethyl-ammonium hydroxide is used as esterification agent, and the conventional method in which triethylamine is used for the same purpose.

By the process described in Example 1, a salt is prepared between 1.16 millimoles of t–BOC–phenylalanine (308 mg.), dissolved in 10 ml. anhydrous methanol, and 0.38 ml. of a 3 N methanolic solution of tetramethyl-ammonium hydroxide.

By esterification with 1 g. of chloromethylated polymer (containing 1.35 milliatom-gram of chlorine per gram of polymer, i.e. 4.79% chlorine) there is obtained a polymer containing 0.63 millimole of t–BOC–phenylalanine per gram of resin, i.e. an esterification yield of 46.5%.

Amino acid analysis: 0.63 millimole of phenylalanine per gram of resin.

Analysis of elementary nitrogen: 0.88%, i.e. 0.63 milliatom-gram per gram of resin.

By using the Merrifield method, i.e. replacing the dioxan by ethanol, on the one hand, and tetramethyl-ammonium hydroxide by triethylamine, on the other hand, and using a chloromethylated resin containing 7.03% of chlorine per gram of resin, i.e., 1.98 milliatom-gram of chlorine per gram of resin, there is obtained a polymer, analysis of which gave the following results:

Analysis of amino acid: 0.49 millimole of phenylalanine per gram of resin.

Analysis of elementary nitrogen: 1.65%, i.e. 1.18 milliatom-gram per gram of resin.

The esterification yield is, therefore, 24.7%.

In conclusion, it is seen that:

(a) The esterification yield according to the process of the present invention is practically double that obtained with triethylamine as esterification agent;

(b) In the case of the process of the present invention, the analyses of amino acid and elementary nitrogen agree perfectly, whereas in the conventional process there is a substantial difference (1.18–0.49=0.69 milliatom-gram of nitrogen/gram of resin) due to the fixing of triethylamine on the chloromethylated polymer.

EXAMPLE 3

This example demonstrates the application of the process of the present invention to various amino acids, proving the superiority of the esterification agents used according to the present invention over triethylamine. The results have been summarised in the form of a table in which the following abbreviations are used:

t-BOC AA=amino acid protected by a t-butoxycarbonyl group
GLY=glycine
VAL=valine
ALA=alanine
ILE=isoleucine
TRP=tryptophane
/N/=amount of elementary nitrogen expressed in milliatom-gram per gram of resin and determined by the Kjeldahl method of determination.
/AA/=amount of t-BOC-amino acid expressed in millimoles per gram of resin, determined by analysis of amino acids.
R=esterification yield in percent referred to the amount of chlorine fixed on the chloromethylated polymer.

The conditions of the operation are as described in Example 1. The polymer is a chloromethylated resin containing 0.58 milliatom-gram of chlorine per gram of resin, i.e. 2.06% of chlorine (for alanine, the same chloromethylated polymer was used as in Example 2); the esterification agent is tetramethyl-ammonium hydroxide in all cases.

| t-BOC AA | R | /N/ | /AA/ |
|---|---|---|---|
| GLY | 70 | 0.41 | 0.40 |
| VAL | 55 | 0.32 | 0.30 |
| ALA | 43 | 0.56 | 0.58 |
| ILE | 72 | 0.42 | 0.41 |
| TRP | 60 | 0.35 | (1) |

1 Destroyed in the acid hydrolysis.

It can be seen that the esterification yields range from 43 to 72%, which represents from twice to three times the yields obtained with the conventional method. It should be noted once again that the analyses of the amino acids agree excellently with the analyses of elementary nitrogen.

EXAMPLE 4

As halomethylated polymer 1 g. of a bromomethylated resin in used containing 0.58 milliatom-gram of bromine/g. of resin, i.e. 4.64% of bromine. The protected amino acid used is t-BOC-glycine, the tetramethyl-ammonium salt of which was prepared in the manner described in Example 1. The solvent used for the esterification is dimethyl formamide, and the quaternary ammonium salt of t-BOC-glycine is reacted with the bromomethylated resin for 6 hours, with agitation, at room temperature.

After filtration and washing successively with dimethyl formamide, water, acetic acid, again with water and finally with methanol, the resin is dried to a constant weight and analyzed in the manner described in Example 1.

Analysis of amino acid: 0.39 millimole of glycine/g. of resin.

Analysis of elementary nitrogen: 0.43 milliatom-gram/g. of resin.

The esterification yield is 74%.

EXAMPLE 5

This example shows that the process of the present invention does not produce racemization of the amino acid fixed on the halomethylated polymer.

The chloromethylated resin of Example 1 is esterified with t-BOC-isoleucine in the presence of tetramethyl-ammonium hydroxide in dioxan, the esterification being carried out at a temperature of 110° C.

Before proceeding with the esterification, the automatic analysis of the amino acids showed that, after acid hydrolysis, the allo-isoleucine content was 1.05%.

After esterification in accordance with the process of the present invention, and despite the drastic temperature conditions used for the esterification, it is found, after acid hydrolysis of the resin, that the allo-isoleucine content in the hydrolysate is 1.4%. Allowing for measurement errors, it may, therefore, be stated that there was no racemization in the esterification of the t-BOC-isoleucine with the chloromethylated resin.

EXAMPLE 6

This example shows that quaternary ammonium hydroxides other than tetramethyl-ammonium hydroxide may be used as esterification agents.

Procedure of Example 1 is followed, except that tetramethyl-ammonium hydroxide is replaced by one of the following quaternary ammonium hydroxides and that the chloromethylated resin used contains 0.50 milliatom-gram of chlorine per gram of resin:

(I) phenyl-trimethyl-ammonium hydroxide
(II) tetra-n-butyl-ammonium hydroxide
(III) methyl-tri-n-butyl-ammonium hydroxide
(IV) tetraethyl-ammonium hydroxide
(V) 1-methyl-2-styryl-pyridinium hydroxide The following table gives the results obtained:

| Quat. amm. hydroxide | t-BOC AA | R | /N/ | /AA/ |
|---|---|---|---|---|
| (I) | ALA | 10 | 0.06 | 0.05 |
| (II) | GLY | 12 | 0.10 | 0.06 |
| (III) | GLY | 28 | 0.21 | 0.14 |
| (IV) | LEU [1] | 40 | 0.28 | 0.20 |
| (V) | PRO [2] | 40 | 0.20 | 0.20 |

[1] LEU=leucine. [2] PRO=proline.

It can thus be seen that the quaternary ammonium hydroxides (I) to (V) are also suitable esterification agents but that tetramethyl-ammonium hydroxide gives particularly favorable results, which is probably due to its low steric hindrance.

I claim:

1. In a process for binding an amino acid having an amine protective group fixed on the amino group to a styrene - divinylbenzene polymer carrying halomethyl groups in which the halogen is chlorine, bromine or iodine, by reacting a salt of the so protected amino acid with the said halomethylated styrene-divinylbenzene polymer in an inert solvent to form an amino acid ester useful in solid phase peptide synthesis, whereby the salt is dissolved in said solvent and the polymer is swelled in said solvent, the improvement wherein the salt of the said protected amino acid is a salt of tetramethyl-ammonium hydroxide.

2. The process of claim 1, wherein the molar ratio of the salt of the protected amino acid to the halogen of the polymer is between 3:1 and 0.5:1.

3. The process of claim 1, wherein the molar ratio of the salt of the protected amino acid to the halogen of the polymer is about 1:1.

4. The process of claim 1, wherein the reaction is performed at a temperature between 50 and 100° C.

5. The process of claim 1, wherein the inert solvent is dioxane.

6. The process of claim 1, wherein the amine protective group is a t-butoxycarbonyl group.

References Cited
UNITED STATES PATENTS

| | | | |
|---|---|---|---|
| 3,563,958 | 2/1971 | Dorman | 260—78 |
| 3,531,258 | 9/1970 | Merrifield et al. | 23—252 |

FOREIGN PATENTS

| | | |
|---|---|---|
| 916,772 | 1/1963 | Great Britain. |
| 966,266 | 8/1964 | Great Britain. |

OTHER REFERENCES

Stewart et al.: Solid Phase Peptide Synthesis, W. H. Freemann and Company, San Francisco (1969), pp. 1–8 and 32.

Merrifield: Advances in Enzymology 32, pp. 221–239 (1969).

Green et al.: J. Chem. Soc., © 1969, pp. 401–405.

March: Advanced Organic Chemistry Reactions, Mechanisms and Structure, McGraw-Hill Book Co., New York (1968), pp. 323–324.

LEWIS GOTTS, Primary Examiner

R. J. SUYAT, Assistant Examiner

U.S. Cl. X.R.
260—112.5, 518 A